United States Patent
Peterson et al.

(10) Patent No.: US 6,319,399 B1
(45) Date of Patent: Nov. 20, 2001

(54) ISOLATION BLOCK

(75) Inventors: Michael J. Peterson, Nashville; Richard M. Russell, Brentwood, both of TN (US)

(73) Assignee: Dialysis Systems, Inc., Nashville, TN (US)

( * ) Notice: Subject to any disclaimer, the term of this patent is extended or adjusted under 35 U.S.C. 154(b) by 0 days.

(21) Appl. No.: 09/339,445

(22) Filed: Jun. 24, 1999

(51) Int. Cl.$^7$ .................................................. B01D 35/00
(52) U.S. Cl. ............................. 210/232; 210/90; 210/92; 210/252; 137/594; 604/905
(58) Field of Search ..................... 285/124.5, 124.4, 285/25, 26; 137/594, 595, 798, 614.05, 557; 210/90, 92, 252, 254, 259, 260, 302, 430, 335, 341, 234, 420, 232; 604/31, 33, 905

(56) References Cited

U.S. PATENT DOCUMENTS

| | | |
|---|---|---|
| 1,087,108 * | 2/1914 | Cummings et al. . |
| 2,470,471 * | 5/1949 | Carleton . |
| 3,399,776 * | 9/1968 | Knuth . |
| 3,570,534 * | 3/1971 | Beavers . |
| 4,103,936 | 8/1978 | Sutcliffe et al. . |
| 4,298,469 * | 11/1981 | LeBlanc et al. . |
| 4,846,506 | 7/1989 | Bocson et al. . |
| 5,092,364 | 3/1992 | Mullins . |
| 5,294,154 | 3/1994 | Le Devehat . |
| 5,315,347 | 5/1994 | Arosio . |
| 5,397,461 * | 3/1995 | Augustin . |
| 5,505,496 | 4/1996 | Nishida et al. . |
| 5,507,529 | 4/1996 | Martins . |
| 5,607,582 * | 3/1997 | Yamazaki et al. . |
| 5,681,456 * | 10/1997 | Delport . |
| 5,741,420 * | 4/1998 | Suh et al. . |
| 5,753,107 * | 5/1998 | Magnusson et al. . |

* cited by examiner

*Primary Examiner*—Joseph W. Drodge
*Assistant Examiner*—Terry K. Cecil
(74) *Attorney, Agent, or Firm*—Waddey & Patterson; Lucian Wayne Beavers

(57) ABSTRACT

A plumbing system for a pure water supply of a dialysis clinic includes an isolation block assembly to which the various purifying components can be quickly connected and disconnected. The isolation block assembly includes an isolation block which has both a supply passage and a discharge passage defined therethrough. A first self sealing quick connect part is connected to the supply passage outlet. A second self sealing quick connect part is connected to the discharge passage inlet. The purifying component may be connected to the isolation block assembly through the use of flexible conduits having complementary self sealing quick connect parts connected thereto, so that the flexible conduits may be connected to the quick connect parts of the isolation block assembly.

11 Claims, 5 Drawing Sheets

ISOLATION BLOCK

BACKGROUND OF THE INVENTION

1. Field of the Invention

The present invention relates generally to plumbing systems for medical apparatus, and more particularly, to such plumbing systems which are designed for use in the pure water supply system of a dialysis clinic.

2. Description of the Prior Art

A dialysis clinic typically utilizes a centralized source of pure water for the dialysis machines. The pure water source typically takes water from a city water source and runs it through a series of softeners and filters which purify the water before it is sent to the dialysis machines.

Traditionally, this series of filters is plumbed together with rigid copper or thermoplastic piping such as PVC and conventional threaded valves connecting the various filters to the piping.

Such traditional piping systems may include bypass loops around a given filter unit to allow that filter unit to be taken off-line without shutting down the entire system.

Problems which are encountered with the traditional system include: 1) the inadvertent or deliberate bypassing of an element of the system potentially endangering the patient's safety, or at a minimum, reducing the efficacy of the system; 2) the difficulty of sterilizing the system, and the presence of lengths of pipe which are sometimes shut off, known as "dead legs", in which water can stagnate and lead to the growth of bacteria and the like which is, of course, undesirable; and 3) the volumes of water trapped within the bypass valves themselves which is stagnated and may grow bacteria.

SUMMARY OF THE INVENTION

The present invention provides a plumbing system for the pure water supply of a dialysis clinic which provides a greatly improved apparatus and method for connecting the various filters into the plumbing system. The apparatus includes an isolation block assembly, which itself includes an isolation block. The isolation block has a supply passage defined therethrough having a supply passage inlet and a supply passage outlet. The isolation block also has a discharge passage defined therethrough having a discharge passage inlet and a discharge passage outlet.

A first self sealing quick connect part, preferably a male adapter part, is connected to the supply passage outlet. A second self sealing quick connect part, again preferably a male adapter part, is connected to the discharge passage inlet.

A filter of the pure water system may then be connected to the isolation block very easily. The filter will itself have a filter inlet and a filter outlet. A flexible pipe conduit will be connected to the filter inlet and a second flexible pipe conduit will be connected to the filter outlet. On the free ends of the flexible conduits are attached additional self sealing quick connect parts which are complementary to the self sealing quick connect parts mounted upon the isolation block. That is, if male adapter parts are mounted on the isolation block, the quick connect parts attached to the free ends of the flexible piping will be female coupling parts.

The filter can be easily connected to the plumbing system by merely connecting the female quick connect parts which are attached to the ends of the flexible piping to the male quick connect parts which are mounted on the isolation block. Simultaneous with that connection, the passages through the isolation block are opened by the internal action of the quick connect parts as they are coupled together.

This provides great ease of installing and removing a given filter unit for service and the like.

This system also substantially eliminates dead legs in the piping system.

Furthermore, the components of the present invention may all be constructed of a heavy duty plastic material which can be easily sterilized.

Accordingly, it is an object of the present invention to provide an improved pure water supply system for a dialysis clinic.

Another object of the present invention is the provision of an isolation block to provide quick coupling of a component to a plumbing system.

Still another object of the present invention is the provision of a pure water supply system which may be easily disinfected.

Still another object of the present invention is the provision of a pure water supply system which is economical to manufacture and assemble.

Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
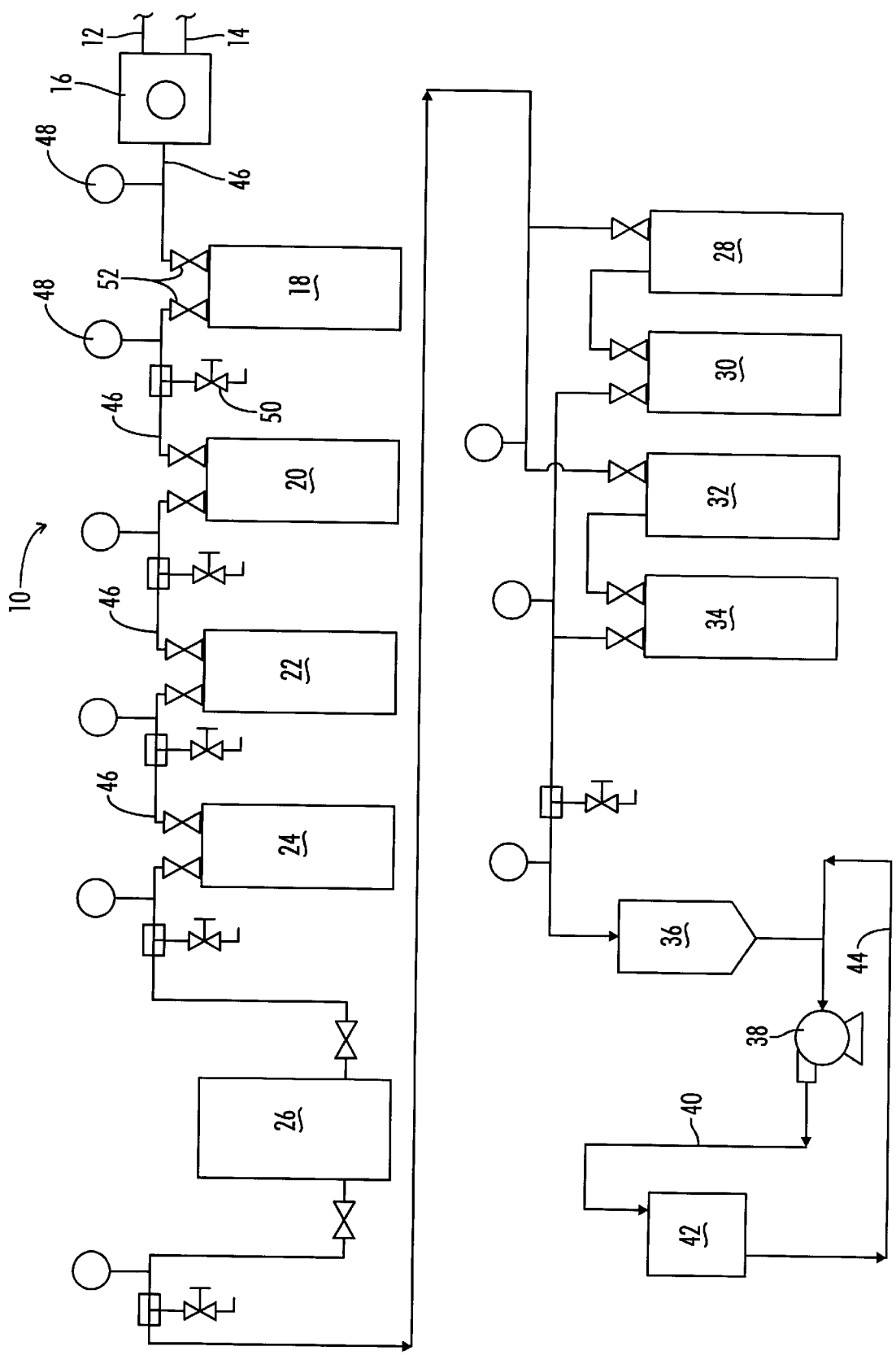
FIG. 1 is a schematic illustration of a plumbing system for a pure water supply of a dialysis clinic.

Referring now to the drawings, and particularly to FIG. 1, a pure water supply system for a dialysis clinic is shown and generally designated by the numeral 10.

Hot and cold city water supply lines 12 and 14 are connected to a tempering valve 16 which provides city water of suitable temperature to the system. Water with or without various additives may be generally referred to herein as aqueous fluid.

The system includes a plurality of filters connected in series, and one example of a typical system would include a mixed media depth filter 18 of the cartridge type, a softener 20, a first carbon tank 22, a second carbon tank 24, and a reverse osmosis unit 26. Following the reverse osmosis unit, there are two parallel sets of de-ionizing units including a first de-ionizing worker unit 28 followed by first de-ionizing polisher unit 30, in parallel with a second de-ionizing worker unit 32 followed by a second de-ionizing polisher unit 34. Downstream of the de-ionizing units is a storage tank 36 which holds the pure water. A series of pumps, such as 38, then circulate the pure water through a supply line 40 to the clinic 42 from which a portion of the water will return by return line 44. The various filters, softeners, reverse osmosis units and de-ionizing units may be generally referred to as purifying components of the pure water supply system 10.

The various purifying components are plumbed in series, that is the water from the city water supply 16 first flows through the mixed media filter 18, then flows through the softener 20, then flows through the first carbon tank 22, etc. The various piping conduits connecting the purifying components in series may be collectively referred to as a pipe header 46. Other typical components of such a piping system include pressure gauges, such as 48 and sample drain valves, such as 50. Also included are shut off valves, such as 52, disposed in the pipe header 46 on either side of a given purifying component.

Figure 2:
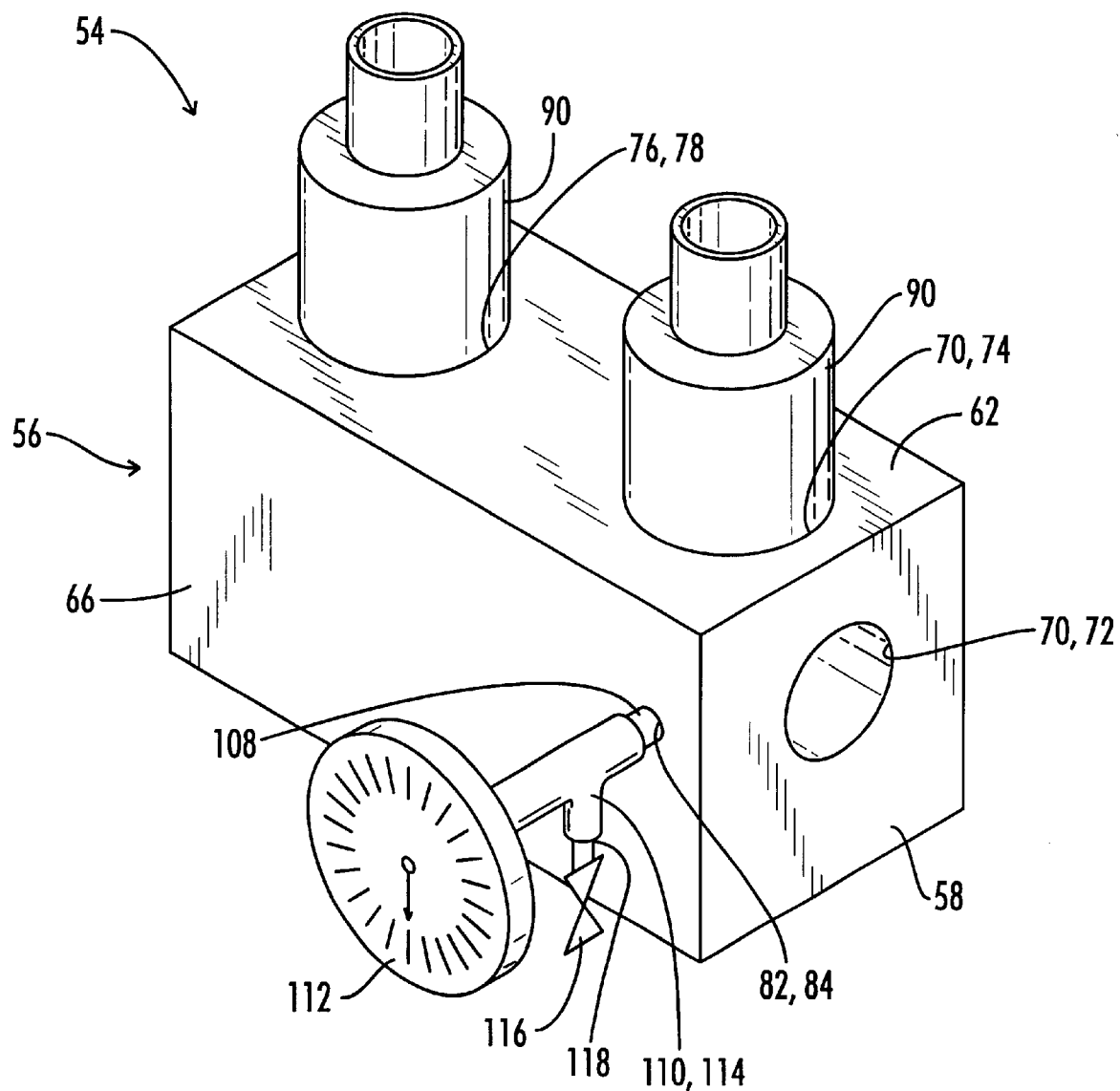
FIG. 2 is an isometric, schematic view, of the isolation block of the present invention having male quick connect adapter parts mounted thereon and having a pressure gauge tap with a pressure gauge and a sample valve mounted thereon.

FIG. 2 is a somewhat schematic isometric view of an isolation block assembly 54 in accordance with the present invention which provides in a very convenient fashion all of the necessary piping connections for connecting a purifying component to the pipe header 46 and for providing the associated components such as shut off valves, pressure gauge and sample valve.

Figure 5:
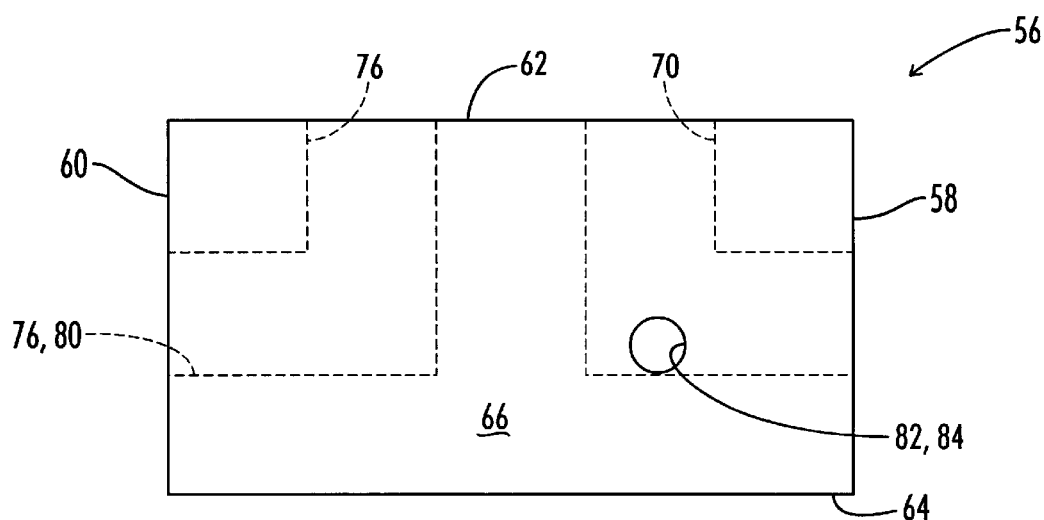
FIG. 5 is a front elevation view of the isolation block of FIG. 2.
Figure 6:
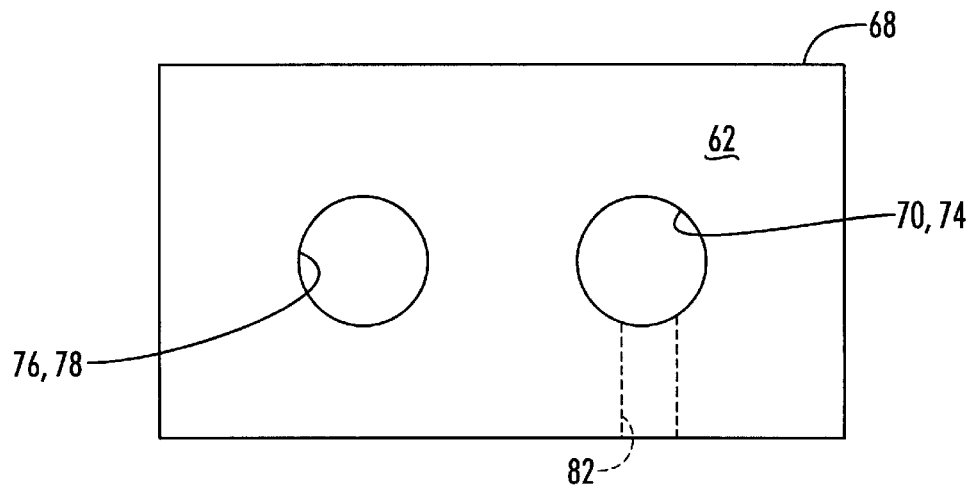
FIG. 6 is a top plan view of the isolation block of FIG. 5.
Figure 7:
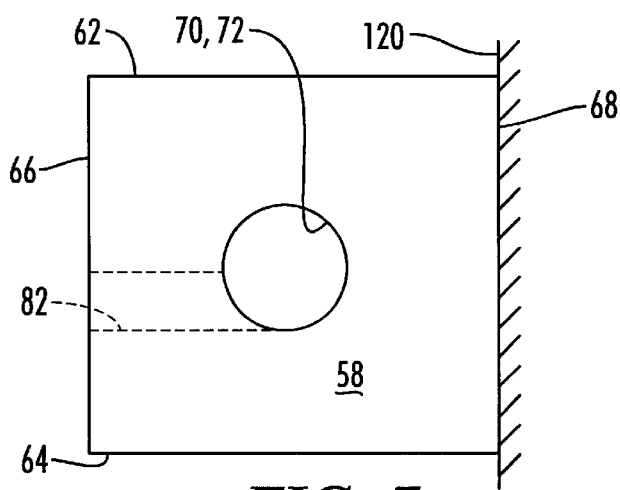
FIG. 7 is a right end view of the isolation block of FIG. 5, the left end view being identical.

The isolation block assembly includes an isolation block 56. The details of construction of the isolation block 56 are best seen in FIGS. 5–7.

The isolation block 56 is preferably constructed from a rectangular parallelpiped shaped structure formed from a heavy duty plastic material, such as polypropylene, Teflon or polyethylene. The block 56 is a six sided block including first and second end surfaces 58 and 60, a top surface 62, a bottom surface 64, a front surface 66, and a back surface 68.

The top surface 62 may generally be described as an intermediate surface 62 located between the first and second end surfaces 58 and 60 of isolation block 56.

The isolation block 56 has a supply passage 70 defined therethrough having a supply passage inlet 72 formed in the first endwall 58 and having a supply passage outlet 74 defined in the top surface 62.

The isolation block 56 includes a discharge passage 76 defined therethrough having a discharge passage inlet 78 defined in top surface 62 and a discharge passage outlet 80 defined in second end surface 60.

The isolation block 56 further includes a pressure tap passage 82 defined therein which intersects the supply passage 70 and which has a pressure tap outlet 84 defined in front surface 66. It is noted that the pressure tap 82 is located at the lower extremity of the supply passage 70, so that the entire supply passage 70 can be drained through the pressure tap 82. This prevents stagnant fluid from being left in the passage 70.

Figure 4:
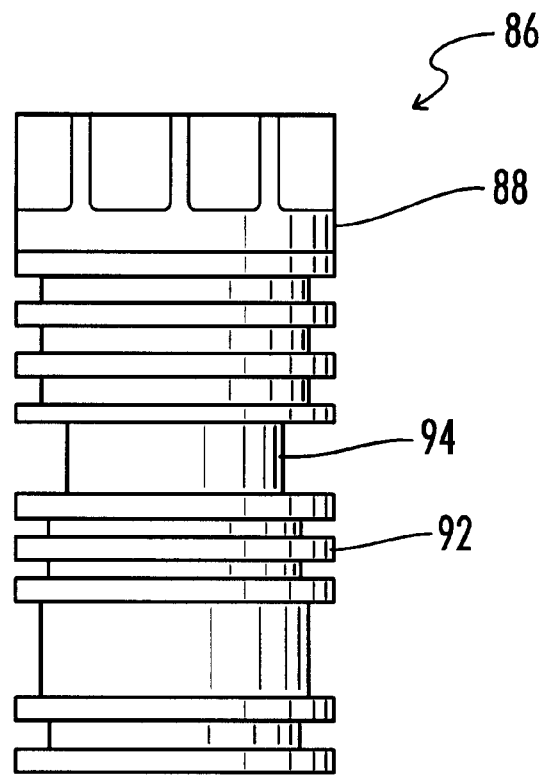
FIG. 4 is an elevation exploded view of a typical prior art quick connect coupling assembly including a female coupling part and a male adapter part.
Figure 4:
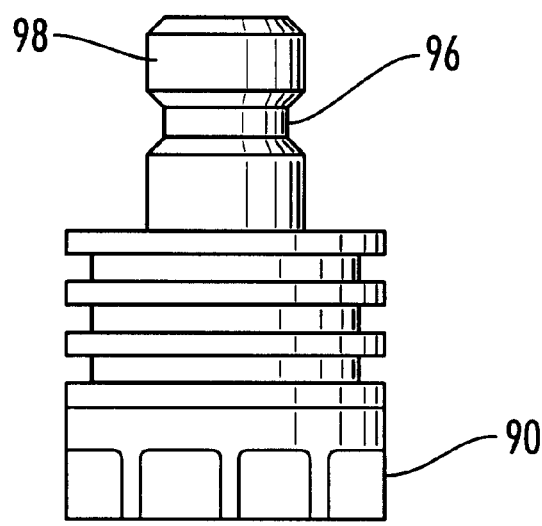

The preferred manner of connecting one of the purifying components to one of the isolation blocks such as 56 is through the use of self-sealing quick connect coupler assemblies 86 such as illustrated in FIG. 4. The quick connect coupling assembly 86 is itself a part of the prior art and may, for example, be a Walther Prazision model 30331-27 Self Sealing Coupling and Self Sealing Adapter Assembly.

The quick connect coupling assembly 86 includes a self sealing female coupling part 88 and a self sealing male adapter part 90.

Figure 3:
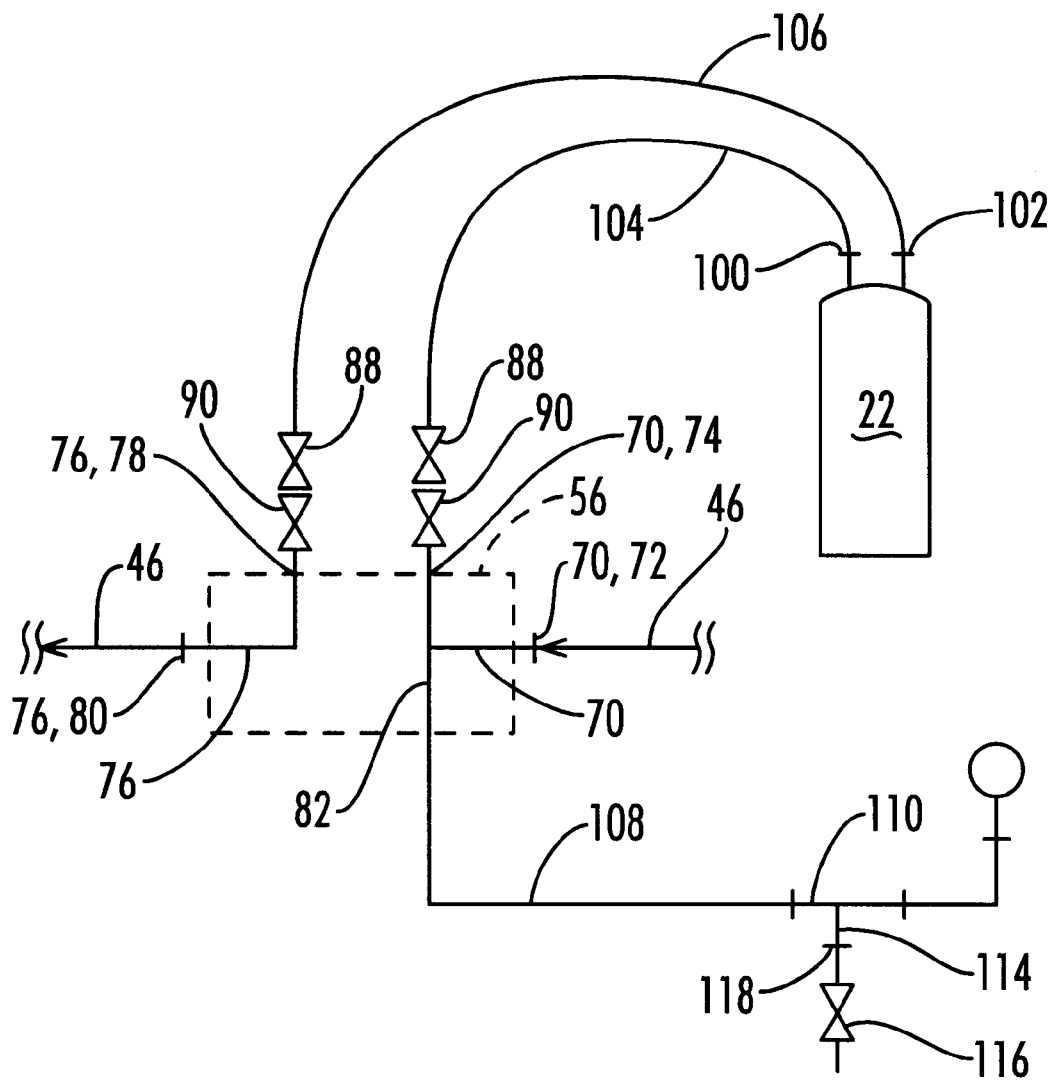
FIG. 3 is a schematic illustration of the hydraulic connections of the apparatus of FIG. 2, having a filter unit connected thereto.

As will be understood by those skilled in the art, the coupling part 88 and adapter part 90 each include flow passages therethrough which are closed by a spring loaded internal valve mechanism when the parts 88 and 90 are disconnected from each other as shown in FIG. 4, and which flow passages are automatically opened when the parts 88 and 90 are placed in engagement with each other as shown in FIG. 3.

The coupling part 88 includes an actuating collar 92 which is slidable relative to a spool 94 thereof. There is contained within the coupling part 88 a ring of ball bearings which are forced into an inwardly biased position when the collar 92 is in a lower position relative to spool 94, and which are released when the collar 92 is pulled to an upward position relative to spool 94. The inwardly biased ball bearings are designed to be received within a groove 96 defined upon a male member 98 of adapter part 90. Thus, in order to engage the coupling part 88 with the adapter part 90, the collar 92 must slide upward relative to spool 94 to release the ring of ball bearings, thus allowing the coupling part 88 to be fitted down over the male member 98 of adapter part 90. Then, the actuator collar 92 is released and is spring biased back downwardly to cam the ball bearings outward into engagement with the annular groove 96, thus locking the coupling member 88 onto the adapter member 90.

FIG. 2 somewhat schematically illustrates a first one of the self sealing quick connect adapter parts 90 connected to the supply passage outlet 74 and a second one of the self sealing quick connect adapter parts 90 connected to the discharge passage inlet 78.

FIG. 3 schematically illustrates the isolation block 56 and the various components attached thereto just described. FIG. 3 also illustrates one of the purifying components such as, for example, first carbon tank 22 connected to one of the isolation blocks 56. The purifying component 22 includes a purifying component inlet 100 and a purifying component outlet 102. Connected to the purifying component inlet 100 and outlet 102 are flexible conduit pipes 104 and 106 which have connected to their free ends female coupling parts 88.

As schematically illustrated in FIG. 3, the purifying component 22 may be connected with the header 46 by simply connecting the female quick connect coupling parts 88 to the male quick connect adapter parts 90 which are permanently mounted upon the isolation block 56.

The pressure tap passage 82 will typically have a pipe nipple 108 connected thereto with a T-shape pipe fitting 110 connected to the nipple 108. A pressure gauge 112 will be threaded in to one end of the T fitting 110. The middle leg 114 of the T fitting 110 will have a sampler valve 116 connected thereto so that a sample of the fluid flowing through the supply passage 70 may be taken by opening the valve 116. A lower end of the middle leg 114 may be referred to as a valved sample port 118 located between the pressure gauge 112 and the pressure tap passage 82.

It will be appreciated that the pure water supply system 10 may include one of the isolation blocks 56 associated with each of the purifying components such as 18, 20, 22, 24, 26, etc. It is not, however, necessary for all of the purifying components to be connected in the manner just described. In some instances for reasons of available space or the like, it may be desirable to plumb some components in a conventional manner and some components utilizing the isolation block of the present invention.

Manner of Operation

The header system 46 including one or more of the isolation blocks 56 will be assembled within the room, and as noted, may be mounted upon the walls 120 of the room. Preferably the isolation block 56 includes male adapter parts 90 mounted thereon, but it will be understood that the male adapter parts could be connected to the flexible hoses 104 and 106 and the female coupling parts could be permanently mounted upon the isolation block 56.

Then one of the purifying components such as carbon tank 22 is set in place adjacent its associated isolation block. Then the female coupling parts 88 which are attached to the hoses 104 and 106 are snapped into place upon the male adapter parts 90. It will be understood that due to the internal construction of the self sealing quick connect coupling assemblies 86, the passages through the female coupling parts 88 and male adapter parts 90 will automatically open as those parts are pressed together. This allows water to flow through the supply passage 70 then through conduit 104 to the purifying component 22, then through the purifying component 22, then out the purifying component outlet 102 and through conduit 106 back through the discharge passage 76 and on downstream through the piping header 46.

When it is desired to remove or replace the purifying component 22, it may be easily disconnected by simply disconnecting the female coupling parts 88 from the male adapter parts 90. This is accomplished by sliding the locking rings 92 upward to unlock the coupling part 88 from the adapter part 90. Upon pulling the coupling part 88 out of engagement with the adapter part 90, the openings therethrough automatically close, thus automatically closing the supply passage 70 and the discharge passage 76.

The piping header 46, isolation blocks 56 and the quick connect coupling parts 88 and 90, as well as the various pipe nipples and the like associated therewith and the flexible pipe conduits 104 and 106 are all preferably constructed from heavy duty plastic material such as Delrin Acetal, Polypropylene, PTFE or PVDF.

It will be appreciated that this manner of construction and this use of materials allows the various components of the plumbing system to be readily disassembled and replaced or disinfected and then reassembled.

Furthermore, due to the elimination of bypass piping around the purifying components, there is a substantial reduction in both the number of and length of the various fluid passages in which water could stagnate, thus greatly reducing the risk of bacteria growing within the system.

Thus, it is seen that the methods and apparatus of the present invention readily achieve the ends and advantages mentioned, as well as those inherent therein. While certain preferred embodiments of the invention have been illustrated and described for purposes of the present disclosure, numerous changes in the arrangement and construction of parts and steps may be made by those skilled in the art which changes are encompassed within the scope and spirit of the present invention as defined by the appended claims.

What is claimed is:

1. A plumbing system for a pure water supply of a dialysis clinic, comprising:

a first purifying component and a second purifying component plumbed in series, the first purifying component including a purifying component inlet and a purifying component outlet;

an isolation block assembly connected to the first purifying component the isolation block assembly including:

an isolation block;

a supply passage defined through the isolation block, and having a supply passage inlet and a supply passage outlet;

a discharge passage defined through the isolation block, and having a discharge passage inlet and a discharge passage outlet;

a first self sealing quick connect part connected to the supply passage outlet and a second self sealing quick connect part connected to the discharge passage inlet;

a flexible inlet conduit having one end connected to the purifying component inlet, and having a second end:

a third self sealing quick connect part connected to the second end of the flexible inlet conduit, the third self sealing quick connect part being selectively engageable with the first self sealing quick connect part to connect the filter inlet with the supply passage of the isolation block;

a flexible outlet conduit having one end connected to the purifying component outlet and having a second end; and a fourth self sealing quick connect part connected to the second end of the flexible outlet conduit, the fourth self sealing quick connect part being selectively engageable with the second self sealing quick connect part to connect the purifying component outlet with the discharge passage of the isolation block.

2. The plumbing system of claim 1, wherein:

the third and fourth self sealing quick connect parts are couplings including a sliding lock member; and the first and second self sealing quick connect parts are adapters including a male member to be received within one of the couplings.

3. The plumbing system of claim 1, wherein:

the isolation block is a rectangular parallelpiped including first and second end surfaces, a top surface, a bottom surface, a front surface and a back surface;

the supply passage inlet is defined in the first end surface and the supply passage outlet is defined in the top surface;

the discharge passage inlet is defined in the top surface and the discharge passage outlet is defined in the second end surface; and the first and second self sealing quick connect parts are mounted on the top surface and extend upward therefrom.

4. The plumbing system of claim 3, further comprising:

the isolation block including a pressure tap passage extending from the front surface into the block and intersecting the supply passage; and a pressure gauge connected to the pressure tap passage.

5. The plumbing system of claim 4, further comprising:

a valved sample port located between the pressure gauge and the pressure tap passage.

6. The plumbing system of claim 1, further comprising:

the isolation block including a pressure tap passage intersecting the supply passage; and a pressure gauge connected to the pressure tap passage.

7. The plumbing system of claim 6, further comprising:

a T-fitting having first and second legs connected to the pressure gauge and the pressure tap passage, respectively, and having a third leg; and a sample valve connected to the third leg of the T-fitting.

8. The plumbing system of claim 1, wherein:

the isolation block assembly is mounted upon a wall of a room in which the plumbing system is located.

9. The plumbing system of claim 8, further comprising:

a second isolation block assembly connected to the second purifying component and mounted upon the wall of the room.

10. The plumbing system of claim 9, further comprising:

a header conduit mounted upon the wall of the room and extending between the discharge passage outlet of the first isolation block assembly to a supply passage inlet of the second isolation block assembly.

11. The plumbing system of claim 1, wherein the isolation block is constructed from a solid block of plastic material.

* * * * *